C. A. HIRTH.
BEARING.
APPLICATION FILED APR. 27, 1915.
1,205,539.
Patented Nov. 21, 1916.
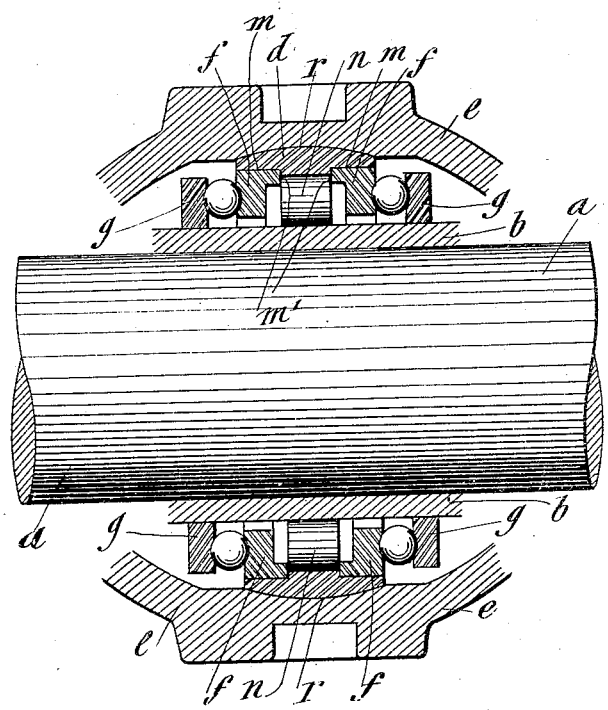
Witnesses:
Inventor
Carl Albert Hirth
By his Attorney

UNITED STATES PATENT OFFICE.

CARL ALBERT HIRTH, OF CANNSTATT-STUTTGART, GERMANY.

BEARING.

1,205,539.　　Specification of Letters Patent.　　Patented Nov. 21, 1916.

Application filed April 27, 1915. Serial No. 24,182.

*To all whom it may concern:*

Be it known that I, CARL ALBERT HIRTH, a citizen of the German Empire, residing in Cannstatt-Stuttgart, in the Kingdom of Wurttemberg, in said Empire, have invented certain new and useful Improvements in Bearings, of which the following is a specification.

This invention relates to bearings, and more particularly to a support roller bearing combined with a pressure bearing, in which the cylindrical rollers are guided by shoulders arranged laterally on one of the races and the improvement consists of the arrangement of these shoulders on the supporting rings of the laterally arranged pressure or thrust bearings. By this is obtained not only a condensed construction of the combined bearing, but the making of a roller bearing race ring with the two guide shoulders is considerably simplified and cheapened in contrast to such forms, in which the shoulders are shaped out of the material of the race ring itself, or are attached as a special part serving only for the guiding of the rollers.

The invention is shown in the drawing of one embodiment hereto annexed, and will be more fully described hereinafter and finally pointed out in the claims.

In the accompanying drawing is shown a section taken through the axis of one embodiment.

Referring to the drawing, the shaft $a$ carries the inner ring $b$ of the roller bearing, on which are fastened in any way, directly or indirectly, the pressure disks $g$, which are movable with the shaft, and which are parts of the two pressure ball bearings. The outer ring $d$ of the roller bearing, which for example, may be seated in a spherical surface $r$ of the bearing body $e$, is provided, besides the race surface, with two lateral annular recesses $m$, in which are inserted the two inner pressure disks $f$ of the pressure ball bearings. The pressure disks $f$ have adjacent their outer peripheries inward flanges $f^1$. The inner ends of these flanges present to the rollers $n$, plane surfaces $m^1$, perpendicular to the axis thereof, which surfaces $m^1$ guide the rollers $n$ at their end surfaces adjacent their outer peripheral contacts in a manner special in itself. It is advantageous to have the inner or outer race for the rollers exactly cylindrical, and to form, on the other hand, the other race partially ball-shaped or spherical, but this construction of the races is not a condition of the invention, which consists essentially in the construction and arrangement of pressure disks $f f$ for the balls $s$, for the purpose that those pressure disks form the guide shoulders $m^1$ for the rollers $n$.

I have shown one embodiment of my invention, but it is clear that changes can be made therein without departing from the spirit thereof, as defined in the appended claims.

Having thus described my invention, I claim as new and desire to secure by Letters Patent:

1. A duplex bearing comprising a central supporting cylinder bearing including concentric rings and a series of cylindrical rollers disposed between them, pressure bearings disposed on opposite sides of said central bearing, said pressure bearings including rings disposed side by side and rollers between them, the inner rings of said pressure bearings having lateral inward flanges engaging the opposite ends of said cylindrical rollers adjacent the peripheral portion in contact with the outer bearing ring.

2. A duplex bearing comprising a central supporting cylinder bearing including concentric rings and a series of cylindrical rollers disposed between them, and pressure bearings disposed on opposite sides of said central bearing, said pressure bearings including inner rings having concave annular grooves, outer rings disposed adjacent to said inner rings and ball rollers disposed between said inner and outer pressure rings, said inner pressure rings having lateral inward flanges engaging the opposite ends of said cylindrical rollers adjacent the peripheral portion in contact with the outer bearing ring.

3. A duplex bearing comprising a central supporting cylinder bearing including an outer ring having annular recesses on its inner face and a cylindrical race surface between them, a series of cylinders traveling on said cylindrical race surface, pressure bearings disposed on opposite sides of said central bearing and including inner and outer rings and rollers between them, said inner rings having lateral inward flanges fitting said recesses and engaging the opposite ends of said cylindrical rollers adjacent the peripheral portion in contact with the outer bearing ring.

4. A duplex bearing comprising a bearing body provided with a segmental spherical concave surface, an outer race ring having on its outer face a segmental spherical surface adapted to fit the spherical surface of said bearing body and provided on its inner face with a central cylindrical race surface and on opposite sides thereof with annular recesses, a series of cylindrical rollers traversing said cylindrical race surface, inner rings disposed on opposite sides of said cylindrical rollers and provided with lateral inward flanges fitting said recesses and engaging the opposite ends of said cylindrical rollers adjacent the peripheral portion in contact with the outer bearing ring, outer rings disposed on opposite sides of said inner rings apart therefrom and rollers disposed between said inner and outer rings.

In testimony that I claim the foregoing as my invention, I have signed my name in presence of two subscribing witnesses.

CARL ALBERT HIRTH.

Witnesses:
 ERNEST ENTENMANN,
 FRIDA KLAIBER.